(12) United States Patent
Fenton

(10) Patent No.: US 11,197,468 B2
(45) Date of Patent: Dec. 14, 2021

(54) FISHING LURE SYSTEM

(71) Applicant: Andrew Fenton, Taren Point (AU)

(72) Inventor: Andrew Fenton, Taren Point (AU)

( * ) Notice: Subject to any disclaimer, the term of this patent is extended or adjusted under 35 U.S.C. 154(b) by 692 days.

(21) Appl. No.: 15/320,692

(22) PCT Filed: Jun. 22, 2015

(86) PCT No.: PCT/AU2015/050347
§ 371 (c)(1),
(2) Date: Dec. 20, 2016

(87) PCT Pub. No.: WO2015/192190
PCT Pub. Date: Dec. 23, 2015

(65) Prior Publication Data
US 2017/0150703 A1  Jun. 1, 2017

(30) Foreign Application Priority Data
Jun. 20, 2014 (AU) ................................ 2014902363

(51) Int. Cl.
*A01K 85/00* (2006.01)
*A01K 85/16* (2006.01)
*A01K 91/04* (2006.01)
*A01K 99/00* (2006.01)

(52) U.S. Cl.
CPC .............. *A01K 85/00* (2013.01); *A01K 85/16* (2013.01); *A01K 91/04* (2013.01); *A01K 99/00* (2013.01)

(58) Field of Classification Search
CPC ........ A01K 85/00; A01K 85/16; A01K 85/18; A01K 91/04

USPC .................................. 43/42.09, 42.28, 42.36
See application file for complete search history.

(56) References Cited

U.S. PATENT DOCUMENTS

| | | | | |
|---|---|---|---|---|
| 889,804 | A * | 6/1908 | Pflueger ................. | A01K 85/12 43/42.06 |
| 1,264,658 | A * | 4/1918 | King ...................... | A01K 85/16 43/42.28 |
| 1,454,820 | A * | 5/1923 | Readle ................... | A01K 85/00 43/42.05 |

(Continued)

FOREIGN PATENT DOCUMENTS

| | | | | |
|---|---|---|---|---|
| EP | 0474959 A1 * | 3/1992 | ............ | A01K 85/00 |
| FR | 2804834 A1 * | 8/2001 | ............ | A01K 91/04 |

(Continued)

*Primary Examiner* — Darren W Ark
(74) *Attorney, Agent, or Firm* — Leason Ellis LLP

(57) ABSTRACT

A fishing lure device for use with a fishing line having a blocking portion includes a lure component with an inner passage through which the blocking portion can pass. A lure connector which is connectable to the lure component has a central passage sized for preventing the blocking portion from passing through it. When the connector is connected to the lure component at one end thereof, with a fishing line extending through the passages with the blocking portion being disposed on a part of the fishing line passing out of opposite end of the lure component, the connector is detachable from the lure component and the lure component is removable from the line by passing the blocking portion through the lure component. The invention also extends to a fishing lure assembly, a method of disassembling a fishing lure device from a fishing line, and a fishing lure device kit.

15 Claims, 4 Drawing Sheets

(56) References Cited

U.S. PATENT DOCUMENTS

| | | | | | |
|---|---|---|---|---|---|
| 1,688,110 | A | * | 10/1928 | Bogart | A01K 85/16 43/42.05 |
| 2,167,334 | A | * | 7/1939 | Hayes | A01K 85/18 43/42.06 |
| 2,183,816 | A | * | 12/1939 | Lovelace | A01K 85/16 43/42.08 |
| 2,365,502 | A | * | 12/1944 | Weesner | A01K 85/00 43/42.28 |
| 2,558,397 | A | * | 6/1951 | Toner, Jr. | A01K 85/02 43/42.1 |
| 2,573,592 | A | * | 10/1951 | Nickel | A01K 85/16 43/42.09 |
| 2,625,767 | A | * | 1/1953 | Pokras | A01K 85/00 43/42.05 |
| 2,750,703 | A | * | 6/1956 | Puste | A01K 85/12 43/42.21 |
| 3,012,356 | A | * | 12/1961 | Tyson | A01K 85/00 43/42.11 |
| 3,169,336 | A | * | 2/1965 | Pope | A01K 85/00 43/42.28 |
| 3,269,050 | A | * | 8/1966 | Garwood | A01K 85/00 43/42.33 |
| 3,359,674 | A | * | 12/1967 | Strumor | A01K 85/18 43/42.09 |
| 3,388,495 | A | * | 6/1968 | Minser | A01K 85/16 43/42.09 |
| 3,423,868 | A | * | 1/1969 | Le Master | A01K 85/18 43/42.15 |
| 3,740,889 | A | * | 6/1973 | Scott | A01K 85/00 43/42.09 |
| 3,867,781 | A | * | 2/1975 | Wolfe | A01K 85/00 43/42.09 |
| 3,947,989 | A | * | 4/1976 | Bart | A01K 85/16 43/42.09 |
| 4,054,004 | A | * | 10/1977 | Schott | A01K 85/02 43/42.09 |
| 4,074,454 | A | * | 2/1978 | Cordell, Jr. | A01K 85/00 43/42.28 |
| 4,163,337 | A | * | 8/1979 | Kress | A01K 85/00 43/42.25 |
| 4,215,506 | A | * | 8/1980 | LeBoeuf | A01K 85/16 43/42.05 |
| 4,616,440 | A | * | 10/1986 | Millroy | A01K 85/12 43/42.06 |
| 4,619,067 | A | * | 10/1986 | West | A01K 85/00 43/42.09 |
| 4,644,681 | A | * | 2/1987 | Hutson | A01K 93/00 43/44.91 |
| 4,777,757 | A | * | 10/1988 | de Marees van Swinderen | A01K 85/01 43/41 |
| 4,831,768 | A | * | 5/1989 | Sorace | A01K 85/00 43/42.05 |
| 4,831,770 | A | * | 5/1989 | Dworski | A01K 85/00 43/42.24 |
| 5,113,607 | A | * | 5/1992 | Pate | A01K 85/00 43/42.09 |
| 5,119,582 | A | * | 6/1992 | Dahl | A01K 85/00 43/42.28 |
| 5,155,948 | A | * | 10/1992 | Kitagawa | A01K 85/00 43/42.28 |
| 5,167,089 | A | * | 12/1992 | Schriefer | A01K 85/00 43/42.28 |
| 5,197,220 | A | * | 3/1993 | Gibbs | A01K 85/16 43/42.09 |
| 5,207,016 | A | * | 5/1993 | Pate | A01K 85/00 43/42.28 |
| 5,369,906 | A | * | 12/1994 | Anterni | A01K 85/16 43/42.09 |
| 5,596,831 | A | * | 1/1997 | McWethy, Jr. | A01K 85/00 43/42.36 |
| 5,661,921 | A | * | 9/1997 | Mason | A01K 85/16 43/42.06 |
| 6,061,948 | A | * | 5/2000 | Boucek | A01K 85/00 43/42.09 |
| 6,327,808 | B1 | * | 12/2001 | Zascavage | A01K 85/00 43/42 |
| 6,357,167 | B1 | * | 3/2002 | Bradford | A01K 85/00 43/42.05 |
| 7,114,285 | B1 | * | 10/2006 | Ince | A01K 85/00 43/42.26 |
| 7,694,453 | B1 | * | 4/2010 | Arrico | A01K 85/02 43/42.13 |
| 8,402,687 | B1 | * | 3/2013 | Jarrell | A01K 85/01 43/42.28 |
| 8,615,920 | B2 | * | 12/2013 | Taylor | A01K 85/16 43/42.09 |
| 9,700,035 | B2 | * | 7/2017 | Taylor | A01K 85/16 |
| 2002/0073607 | A1 | * | 6/2002 | Hickok | A01K 85/00 43/42.25 |
| 2006/0042147 | A1 | * | 3/2006 | Jenkins | A01K 85/16 43/42.09 |
| 2011/0162254 | A1 | * | 7/2011 | Smits | A01K 85/00 43/42.36 |
| 2013/0199080 | A1 | | 8/2013 | Woosley | |
| 2013/0291424 | A1 | * | 11/2013 | Taylor | A01K 85/16 43/42.49 |
| 2014/0311011 | A1 | * | 10/2014 | Guntharp | A01K 85/12 43/42.09 |
| 2019/0313616 | A1 | * | 10/2019 | Aguilar | A01K 85/00 |

FOREIGN PATENT DOCUMENTS

| | | | | | |
|---|---|---|---|---|---|
| GB | | 2448286 | A | * 10/2008 | A01K 85/08 |
| GB | | 2473609 | A | * 3/2011 | A01K 85/08 |
| JP | | H0655354 | U | * 8/1994 | |
| JP | | 11332418 | A | * 12/1999 | |
| JP | | 2003299425 | A | * 10/2003 | A01K 85/08 |
| JP | | 2010273637 | A | * 12/2010 | |
| JP | | 2015039352 | A | * 3/2015 | |
| WO | WO 2010/131036 | | | 11/2010 | |
| WO | WO-2016007643 | A1 | * | 1/2016 | A01K 85/00 |

* cited by examiner

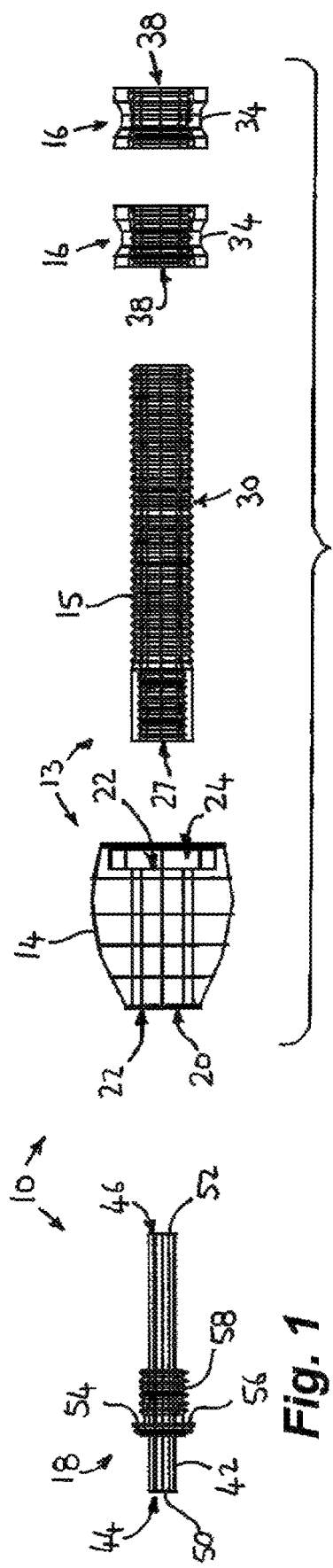
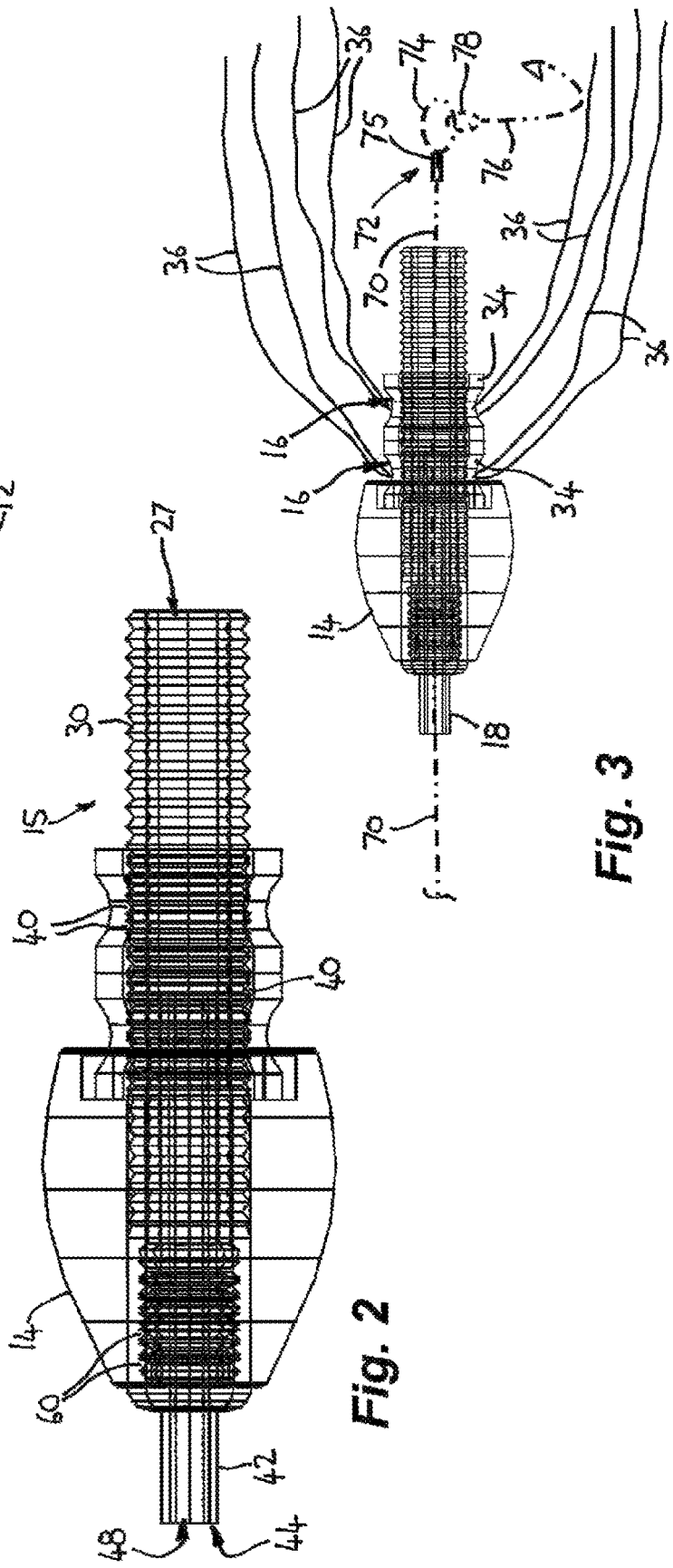
Fig. 1
Fig. 2
Fig. 3

FISHING LURE SYSTEM

CROSS-REFERENCE TO RELATED CASES

This application is a U.S. National Stage Application under 35 U.S.C. § 371 of International Patent Application No. PCT/AU2015/050347, filed Jun. 22, 2015 which claims priority to Australia Application No. 2014902363, filed Jun. 20, 2014, which are hereby incorporated by reference in their respective entireties.

FIELD OF THE INVENTION

This invention relates to a fishing lure device and assembly, to a method of using a fishing lure device, and to a fishing lure device kit.

BACKGROUND TO THE INVENTION

Fishing lures have been used for many years to assist fishermen to catch fish. Lures having different characteristics have been used in endeavours to make the process of catching fish more successful, taking into account the nature of the particular fish, the type of prey that they are attracted to, times of day that they may seek their prey, and so on.

A modern fishing lure typically includes a head component and a skirt or body component. The head is for achieving a desired effect for attracting fish, for example causing the lure to spin, to move in a jerky fashion, to move rapidly through the water, create bubbles, and so on, depending on the type of fish being targeted. Often, such movements are selected to mimic the motion of the types of sea-life that the fish being sought often regard as prey.

A modern skirt- or body component typically includes a collar which is connected to the head portion, and a skirt which typically includes strands often formed by rubber tubes, or tassels, connected at one end to the collar. These strands and tassels are often coloured, the colours being selected based on the characteristic and nature of the fish being targeted, weather conditions, the time of day during which fishing activities are taking place, and so on.

The manner in which such modern lures are configured typically involves a fishing line extending through a central passage of the combined head and skirt components, with an end of the line terminating beyond a free end of the collar of the skirt portion, with a fishing hook (or possibly more than one hook) being secured adjacent to that end of the line.

Typically, the line extends beyond the other end of the lure, that is, the end of the head component opposite the end to which the skirt component is joined. The line extends from that end for some distance, that portion of the line being known as a "leader". An example of the length of a typical leader is 2 metres.

At the end of the leader portion of the line remote from the lure, there is typically provided a connector, by which the leader is connected to a loop on another, main portion of the fishing line, usually of significantly greater length than the leader, and which is secured to the reel of a fishing rod.

When a fish is caught and reeled in using the fishing rod, in competition circumstances, the fish is regarded as having been caught once the fishing line has been reeled in to such an extent that the fishermen can take hold of the leader line.

It will be appreciated that different lures are suitable depending on the different types of fish being targeted and other factors, such as environmental conditions. For example, different lures may have differently shaped heads and different skirt/body features.

An inherent problem with existing fishing tackle is that it is often expensive. While it is often desirable for a fisherman to have a sufficient range of lures which may be suitable for the different fish that the fishermen wishes to catch, given the large number of permutations of heads and skirts that may be involved, this can be a very costly exercise.

In addition, in order to replace a lure, typically the leader portion of the line together with the lure attached thereto, would need to be detached from the main portion of the line which is connected to the fishing rod, and a replacement lure, together with its own respective leader line, would need to be connected to the main portion of the fishing line.

In order to provide the fishermen with a practically useful number of different lures which may be desired under different fishing circumstances, a relatively large number of different units, each consisting of such a lure and a leader line, may be required. Apart from the cost usually involved, this can be problematic especially where space in a fishing boat is limited, as the leader lines attached to the different lures can easily become entangled with one another.

In addition, the process of the detaching a particular lure together with its leader line from the main line attached to the fishing rod can be time-consuming and therefore not ideal in a situation where a rapid change of lure is required. An example of this is where a fisherman is attempting to catch a particular type of fish when a school of another type of desirable fish requiring a different lure is spotted in the same fishing vicinity.

It is an object of the present invention to overcome or ameliorate disadvantages of the prior art, or to provide a useful alternative thereto.

SUMMARY OF THE INVENTION

According to a first aspect of the invention, there is provided a fishing lure device for use with an elongate fishing line having a fishing line thickness, the fishing line being provided with a blocking portion of broader lateral dimension than the fishing line thickness, the lure device including:

a lure component having a first lure component end and a second lure component end and an inner lure component passage extending from the first lure component end to the second lure component end, the lure component including a lure head formation, wherein the lure component passage has an inner diameter adapted to allow the blocking portion to pass therethrough; and an elongate lure connector having a first connector end and a second connector end and a central connector passage extending from the first connector end to the second connector end, wherein the connector passage has an inner diameter adapted to obstruct the blocking portion to prevent the blocking portion from passing therethrough, wherein the lure connector is adapted to be releasably connectable to the lure component by passing the lure component in a first direction relative to the lure connector over the second connector end such that the lure connector extends at least partly into the lure component passage via the first lure component end, and such that, when the fishing line is disposed so as to extend through the connector passage and lure component passage with the blocking portion being disposed on a part of the fishing line immediately adjacent to the second lure component end, the lure connector and lure component are detachable from each other by withdrawing the lure component in a second direction opposite to the first direction relative to the lure connector, and the lure component is removable from the line by moving the lure component and blocking portion relative to each other such that the blocking portion passes through the lure component passage in the first direction relative to the lure component.

In a preferred embodiment, the fishing lure device is adapted for the lure component passage and connector passage to be co-axial relative to each other when the lure connector is connected to the lure component.

In a preferred embodiment, the connector passage has an inner diameter which is less than an inner diameter of the lure component passage.

In a preferred embodiment, the lure connector is adapted, when connected to the lure component, to protrude from the first lure component end.

Then, preferably, the lure connector includes a stop formation for limiting the extent to which the lure connector can be received within the lure component passage.

In a preferred embodiment, the lure component includes at least one skirt component which is releasably connectable in relation to the head formation.

Then, preferably, the lure component includes a skirt connector adapted for enabling said releasable connection of the at least one skirt component.

Preferably, the lure component includes an extension portion extending from the head formation, the extension portion including the skirt connector.

Preferably, the at least one skirt component is releasably connectable in relation to the head formation by way of the at least one skirt component being releasably connectable to the extension portion.

In a preferred embodiment, the head formation is releasably connectable to the lure connector, and, by way of being releasably connectable to the extension portion, is releasably connectable to the at least one skirt component.

Preferably, the or each skirt component includes skirt tassels.

According to a second aspect of the invention, there is provided a fishing lure assembly including:
  a fishing lure device; and
  an elongate fishing line having a fishing line thickness, the fishing line being provided with a blocking portion of broader lateral dimension than the fishing line thickness, wherein the lure device includes:
    a lure component having a first lure component end and a second lure component end and an inner lure component passage extending from the first lure component end to the second lure component end and including a lure head formation, wherein the lure component passage has an inner diameter adapted to allow the blocking portion to pass therethrough; and
    an elongate lure connector having a first connector end and a second connector end and a central connector passage extending from the first connector end to the second connector end, wherein the connector passage has an inner diameter adapted to obstruct the blocking portion to prevent the blocking portion from passing therethrough,
  wherein the lure connector is adapted to be releasably connectable to the lure component by passing the lure component in a first direction relative to the lure connector over the second connector end such that the lure connector extends at least partly into the lure component passage via the first lure component end, wherein the fishing line is disposed so as to extend through the connector passage and lure component passage with the blocking portion being disposed on a part of the fishing line immediately adjacent to the second lure component end, the lure connector and lure component being detachable from each other by withdrawing the lure component in a second direction opposite to the first direction relative to the lure connector, and the lure component is removable from the line by moving the lure component and blocking portion relative to each other such that the blocking portion passes through the lure component passage in the first direction relative to the lure component.

According to a third aspect of the invention, there is provided a method of disassembling portion of a fishing lure device from a fishing line, the method including:
  providing a fishing lure device together with a fishing line having a fishing line thickness, the fishing line being provided with a blocking portion of broader lateral dimension than the fishing line thickness, wherein the fishing lure device includes a lure component having a first lure component end and a second lure component end and an inner lure component passage extending from the first lure component end to the second lure component end, the lure component including a lure head formation, wherein the lure component passage has an inner diameter adapted to allow the blocking portion to pass therethrough, the fishing lure device further including an elongate lure connector having a first connector end and a second connector end and a central connector passage extending from the first connector end to the second connector end, wherein the connector passage has an inner diameter adapted to obstruct the blocking portion to prevent the blocking portion from passing therethrough, the lure connector being releasably connected to the lure component so as to extend at least partly into the lure component passage via the first lure component end, with the fishing line being disposed so as to extend through the connector passage and lure component passage with the blocking portion being disposed on a part of the fishing line that passes out of the lure component passage via the second lure component end;
  detaching the lure connector from the lure component; and
  removing the lure component from the fishing line by passing the blocking portion through the lure component passage in a direction, relative to the lure component, from the second lure component end towards the first lure component end.

In a preferred embodiment, in the step of providing a fishing lure device together with a fishing line, the lure component includes at least one skirt component which is releasably connectable in relation to the head formation, the method including disconnecting the at least one skirt component in relation to a remainder of the lure component, and removing the at least one skirt component from the fishing line.

According to a fourth aspect of the invention, there is provided a fishing lure device kit adapted for assembling a fishing lure device for use with a fishing line having a fishing line thickness, the fishing line being provided with a blocking portion of broader lateral dimension than the fishing line thickness, the kit including:
  a plurality of selectable lure head formations each lure head formation being for respective use in constituting a part of a lure component having a first lure component end and a second lure component end and an inner lure component passage extending from the first lure component end to the second lure component end, wherein the lure component passage has an inner diameter adapted to allow the blocking portion to pass therethrough; and an elongate lure connector having a first connector end and a second connector end and a central connector passage extending from the first connector end to the second connector end, wherein the connector passage has an inner diameter adapted to obstruct the blocking portion to prevent the blocking portion from passing therethrough, wherein the lure connector is adapted to be releasably connectable to the lure component with a said head formation being part of the lure component by passing the lure component in a first direction relative to the lure connector over the second connector end such that the lure connector extends at least partly into the lure component passage via the first lure component end when, and such that, when the fishing line is disposed so as to extend through the lure component passage and connector passage with the blocking portion being disposed on a part of the fishing line immediately adjacent to the second lure component end, the lure connector and lure component are detachable from each other by withdrawing the lure component in a second direction opposite to the first direction relative to the lure connector, and the lure component is removable from the line by moving the lure component and blocking portion relative to each other such that the blocking portion passes through the lure component passage in the first direction relative to the lure component.

BRIEF DESCRIPTION OF THE DRAWINGS

Preferred embodiments of the invention will now be described, by way of example only, with reference to the accompanying drawings in which:

FIG. 1 is a schematic exploded view, shown partly cut away, of a fishing lure according to an embodiment of the invention;

FIG. 2 is a schematic assembled view, shown partly cut away, of the fishing lure of FIG. 1;

FIG. 3 is a schematic view shown partly cut away, of the fishing lure as shown in FIG. 2, together with a fishing line and hook;

DETAILED DESCRIPTION

Figure 4:
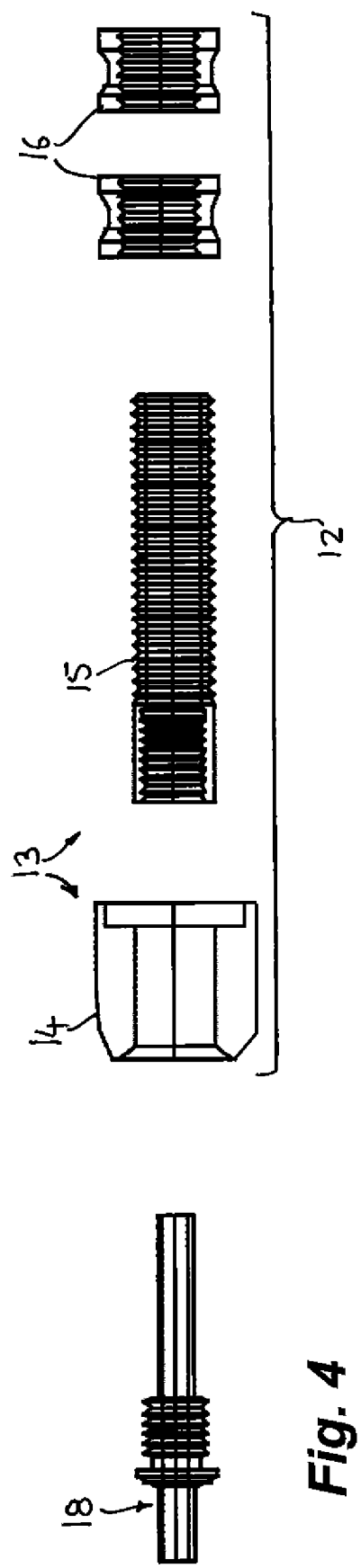
FIGS. 4 and 5 are a schematic exploded view and schematic assembled view, respectively, shown partly cut away, of part of a fishing lure according to a different embodiment to that shown in FIGS. 1 to 3.
Figure 5:
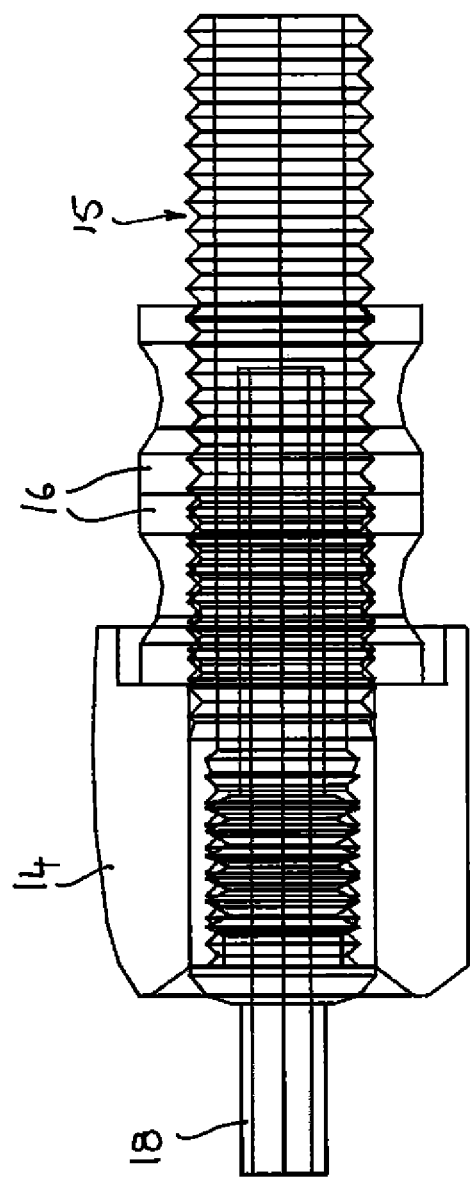
Figure 6:
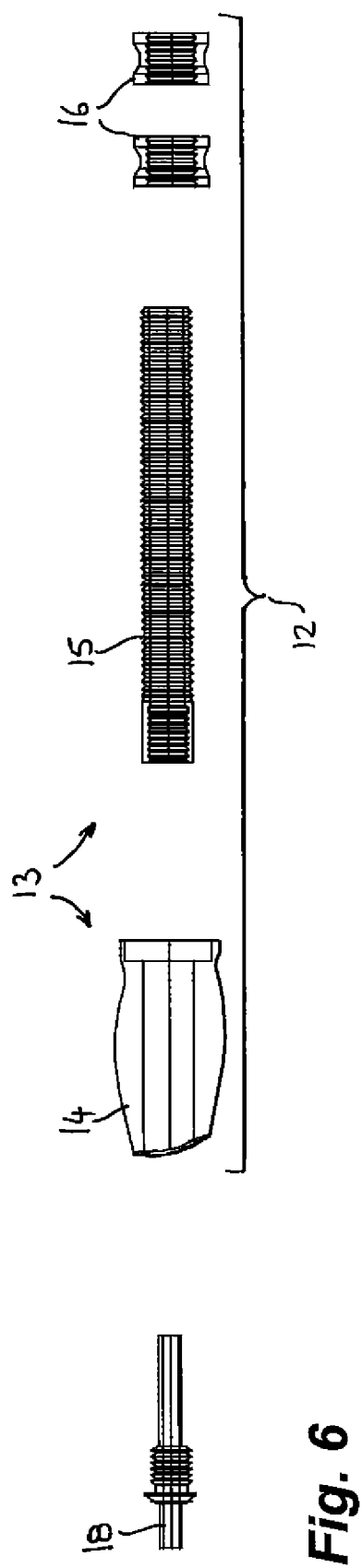
FIGS. 6 and 7 are a schematic exploded view and schematic assembled view, respectively, shown partly cut away, of a fishing lure according to a different embodiment to those shown in FIGS. 1 to 3 and FIGS. 4 and 5.
Figure 7:
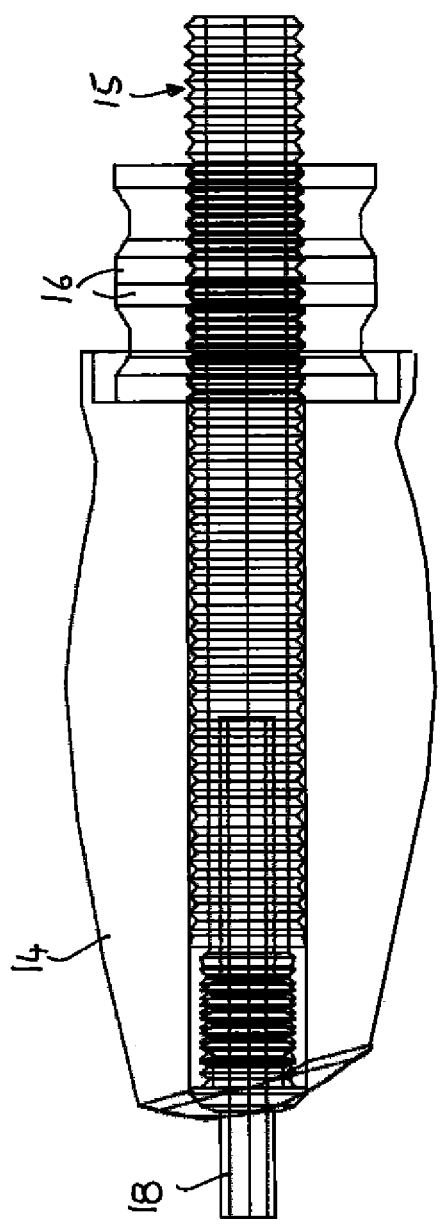

Referring to FIGS. 1 to 3, there is shown an exploded view of a fishing lure device 10 according to an embodiment of the invention. The device 10 includes a lure component generally referenced 12, which includes a lure head component 13, which in turn includes a head formation 14 and an elongate cylindrically shaped extension portion in the form of a shaft 15. The lure component 12 further includes two lure skirt components 16.

As in the case of traditional lures, the shape of the head formation 14 may be selected based on the desired characteristics of movement of the lure device 10 through the water during fishing activities.

In addition, the device 10 also includes an elongate lure connector 18.

The head formation 14 has an inner passage 20 which opens out, at openings 22, at opposite ends of the head formation. In addition, at one end of the head formation 14, there is provided a recess 24.

The extension shaft 15 has an inner tubular passage 27 running along its length and an external screw thread 30. The left hand end of the extension shaft 15 as shown in FIGS. 1 to 3 is adapted to be received via the right hand opening 22 as shown of the head formation 14, into the passage 20 and glued in place by a suitable adhesive to prevent removal of the extension shaft from the head formation so that the head component 13 is essentially one part As the extension shaft 15 extends within the passage 20, the inner tubular passage 27 constitutes an inner passage of the head component 13 as indicated in FIG. 2.

When the extension shaft 15 is connected to the head formation 14 in this manner as shown in FIG. 2, a portion of the part of the shaft having the screw thread 30 protrudes from the head formation.

Each skirt component 16 includes a collar 34 and a skirt 36 which consists of a number of flexible strands which may be of natural rubber or similar synthetic materials, and may, for example, be in the form of hollow tubes (shown in FIG. 3 but not shown in FIG. 1 or 2).

The skirt 36 is joined to the collar around the circumference thereof, for example by a suitable adhesive. Although only four strands of the skirt 36 are shown in FIG. 3, the actual number of strands is significantly greater than that, arranged in a skirt configuration.

Each collar 34 has a passage 38 extending through it, the passage having an internal screw thread 40 (see FIG. 2), which is complementary to the screw thread 30 on the extension shaft 15.

The connector 18 includes a tube portion 42 having a first end 44 and a second end 46. A central passage 48 extends the full length of the tube portion 42, and opens out at openings 50 and 52 at the ends 44 and 46, respectively.

Positioned along the length of the tube portion 42 is a radially outwardly extending collar 54 having a seating surface 56, and adjacent to the seating surface, an external screw thread 58.

The inner passage 20 of the head formation 14 is provided with a screw thread 60 which is complementary to the screw thread 58 of the connector 18. The screw thread 60 forms part of the extension shaft 15 and is located within the inner tubular passage 27 as indicated in FIGS. 1 and 2.

When the device 10 is assembled as shown in FIG. 2, the extension shaft 15 is partly accommodated within, and fixed to, the head formation 14 as described above, these parts together constituting the head component 13.

The skirt components 16 are secured to the extension shaft 15 by means of the collars 34 being screwed onto the extension shaft, so that the screw threads 40 of the collars are engaged with the screw threads 30 of the extension shaft.

The collar 34 of the left-hand skirt component 16 as shown in FIG. 2 is partly accommodated within the recess 24, with the collar of the other skirt component abutting the first-mentioned collar.

With the skirt components 16 juxtaposed in this manner, a small portion of the skirt 36 of the right hand skirt component 16 as shown, is accommodated within, or surrounded by, the skirt of the other skirt component.

In addition, the connector 18 is secured to the head formation 14 such that the screw thread 58 is engaged with the screw thread 60 of the head component 13 formation, with part of the tube portion 42 extending within the inner tubular passage 27 of the extension shaft 15 as shown.

The seating surface 56 of the collar 54 limits the extent to which the connector 18 can be moved into the head formation 14 as the seating surface 56 engages with the left-hand extremity of the head formation, as shown.

All of the components described above are of round cross section (i.e. in the direction when viewed from left to right or vice versa) in FIGS. 1 to 3.

The device 10 can be used in conjunction with a fishing line 70, as shown in dashed lines in FIG. 3. The fishing line 70 has a free end 72 at which there is provided a loop 74. In another embodiment, instead of the loop 74, there may be a loop connector.

A fishing hook 76, also shown in dashed lines in FIG. 3, is secured to the loop 74 by means of a releasable connector 78.

The fish hook 76 and connector 78 are standard components as would be understood by a person skilled in the art.

The loop 74 is retained in its looped configuration by a suitable crimp 75.

The end (not shown) of the fishing line 70 opposite to the end 72 can be suitably connected to the reel of a fishing rod (also not shown).

When the device 10 is in its assembled condition as shown in FIGS. 2 and 3, and is placed on a fishing line 70 having a fishing hook 76 as shown in FIG. 3, the device can be used for conventional fishing activities, as would be understood by a person skilled in the art.

If it is desired to replace the head formation 14 with another head formation, or either of the skirt components 16 with another skirt component, or if it is desired to make combinations of such replacements, then this can be done in the manner described below.

First, the fish hook 76 needs to be detached from the fishing line 70 by disengaging the connector 78 from the loop 74.

The head component 13 can be rotated relative to the connector 18 such that the screw thread 58 of the connector is released from the screw thread 60.

The lateral size of the loop 74 (which is the vertical dimension as shown in FIG. 3) is greater than the width (diameter) of the central passage 48 of the lure connector 18, but, in a preferred embodiment, less than the width (diameter) of the passage 27 of the extension shaft 15 and the passage 20 of the head formation 14, and hence, also less than that of the passages 38 of the skirt components 16.

As a result, once the connector 18 is detached from the head component 13 as described above, the connector together with the line 70 and loop 74 can be separated from the head component and skirt components 16.

In this process, as the connector 18 is withdrawn from the passage 20 of the head formation 14, the line 70 and loop 74 can also be withdrawn, through the passage 27 of the extension shaft 15, through the passages 38 of the skirts 16, and through the passage 20 of the head formation, thereby enabling the connector 18 and lure component 12 to be separated from each other.

Even if the lateral size of the loop 74 is larger than the width of the passage 27, it is so slightly larger that it can still be drawn therethrough by undergoing slight deformation.

On the other hand, the width of the loop 74 is sufficiently greater than the width (diameter) of the passage 48 of the connector 18 that it cannot be readily with withdrawn through that passage. The loop 74 therefore services as a blocking portion of the line 70. This assists to retain the lure device 10, when assembled, on the line 70, and to retain the connector 18 on the line when the connector is detached from the head component 13.

The skirt components 16 can be independently detached from the head component 13 by simply unscrewing them from the extension shaft 15 such that the screw threads 40 of the skirt components are released from the screw thread 30 of the extension shaft. As indicated above, the diameters of the passages 38 of the skirt components 16 are greater than the lateral size of the loop 74, so that the loop can pass though the skirt components as the skirt components are withdrawn from the head component 13.

The head component 13 or either of the skirt components 16, or any of these components in combination, can be replaced by other desirable components of the same type, for example, other head components having different sizes or shapes and hence movement characteristics in the water, other skirt components having different colours, shapes, etc.

In FIGS. 4 and 5 and FIGS. 6 and 7, there are shown lure devices 10 of different shapes to that of FIGS. 1 to 3. In these figures, parts corresponding to parts in FIGS. 1 to 3 have the same reference numbers as in those figures. In these figures, the head formations 14, unlike the head formation of FIGS. 1 to 3, are not of round cross section, but are otherwise formed for achieving different movement characteristics in the water as would be understood by those skilled in the art.

In FIGS. 8 to 16, there are shown parts of lure components 12 according to further, different embodiments. In these figures, parts corresponding to parts in FIGS. 1 to 3 have the same reference numbers as in those figures.

Figure 8:
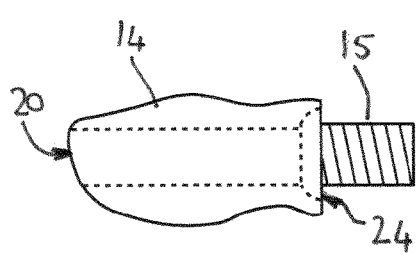
FIGS. 8 to 16 are schematic views of parts of lure components according to different embodiments to those shown in the preceding figures.

In FIG. 8 there is shown a side view of a head formation 14 and extension shaft 15, these components being integrally joined to each other unlike the head formation and extension shaft of previous embodiments. The shape of the head formation 14 of FIG. 8 is such that is may be referred to as a slant cup face and slant face head formation, as known in the art.

Figure 9:
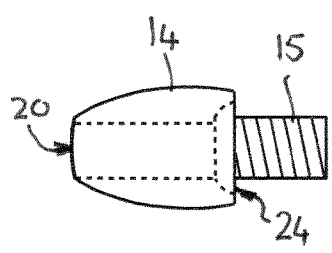
Figure 10:
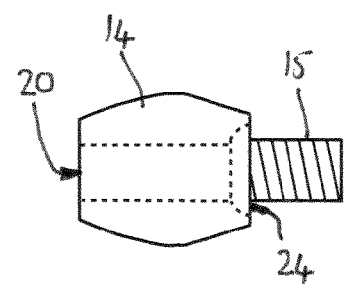

The head formation 14 and extension shaft 15 shown as side views in each of FIGS. 9 and 10 are also integrally joined as in the case of the embodiment of FIG. 8. The head formation 14 of the embodiment of FIG. 9 is a bullet-shaped head (which can be referred to as a bullet head, as known in the art), while that of FIG. 10 is of a shape that may be referred to as a pusher head, as known in the art.

Figure 11:
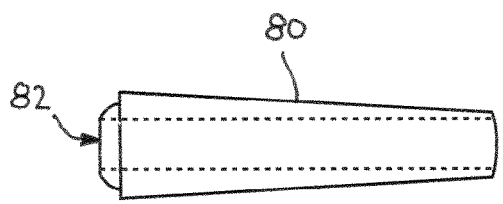

In FIG. 11, there is shown a side view of a tube plug 80 having a threaded central passage 82. The tube plug 80 may for example be used in conjunction with any of the head formation 14 and extension shaft 15 combinations of FIGS. 8 to 10. The passage 82 is dimensioned so as to receive the extension shafts 15 of the embodiments of those figures and the thread of the passage is complementary to the threads of the embodiments of those figures. The tube plug 80 may be used to achieve desirable movement characteristics of the lure component 12 through the water.

Figure 12:
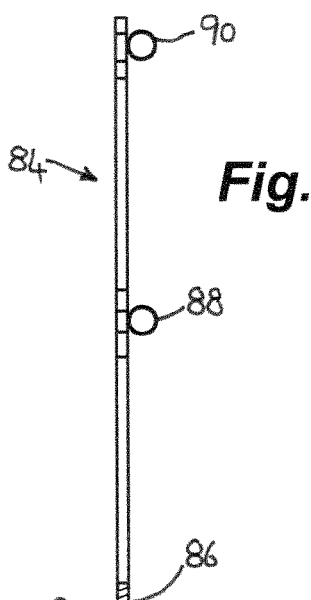

In FIG. 12 there is shown a side exploded view of a dredge head formation 14 (also known in the art as a dredge head) and a dredge arm 84. Although only one dredge arm 84 is shown, the dredge head formation 14 is adapted for use with a plurality of dredge arms.

Each dredge arm 84 has a threaded screw end 86, and is provided with an attachment loop 88 positioned about midway along the length of the arm and a further attachment loop 90 at the end of the arm opposite the threaded end.

The dredge head formation 14 of FIG. 12 is provided with a plurality of screw holes 92 arranged circumferentially around the head formation, these holes being provided with screw threads (not shown) which are complementary to the screw threads of the threaded ends 86 of the arms. Thus, the threaded ends 86 of the arms 84 can be screwed into the holes 92 to attach the dredge arms 84 to the dredge head formation 14.

The attachment loops 88, 90 are for allowing the attachment of fishing decoys or the like (not shown), so that when the dredge head formation 14 and plurality of attached dredge arms 84 are pulled through the water, they may mimic the appearance of fish swimming in a closely bunched school, to assist in catching other fish that might regard such schools of fish as attractive prey.

Figure 13:
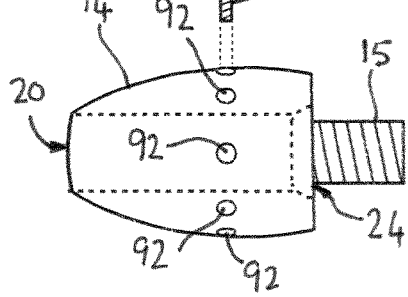

In FIG. 13 there is shown a side view of a head formation 14 and skirt component 16 which, unlike previous embodiments are formed as a single integral unit. This combined head formation 14 and skirt component 16 of FIG. 13 may be used instead of the separate components as described with reference to FIGS. 1 to 7.

Figure 14:
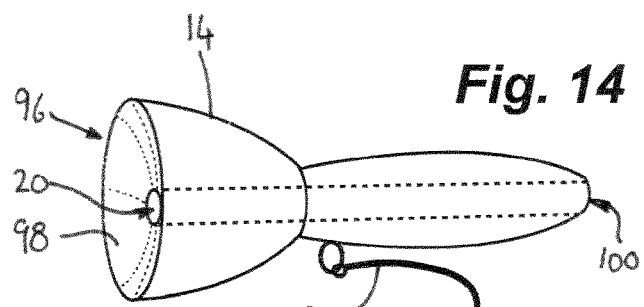

In FIG. 14 there is shown a perspective view of a head formation 14 known in the art as a popper head, together with a fishing hook 94. The popper head formation 14 of FIG. 14 can be used without an extension shaft 15 and without a skirt component 16 or skirts 36. The popper head formation 14 has a leading end 96 which has a concave recess 98, and is substantially hollow or otherwise of low weight so as to be adapted to float at the water surface. The shape of the popper head formation 14 of FIG. 14 is such as to assist the head formation, when it is pulled along the water, to bob around or bounce rapidly and to assist in creating turbulence and bubbles for attracting fish.

While the popper head formation 14 of FIG. 14 is shown as being provided with a fish hook 94, it may be provided with a further fish hook 76 attached to a fishing line 70 (the hook 76 and fishing line not being shown in FIG. 14) in a similar fashion to that described above in relation to FIGS. 1 to 7 above. In this case, the loop 74 to which the additional hook 76 is fixed will be formed in a part of the fishing line extending from the end 100 of the popper head formation 14 opposite the leading end 96.

Figure 15:
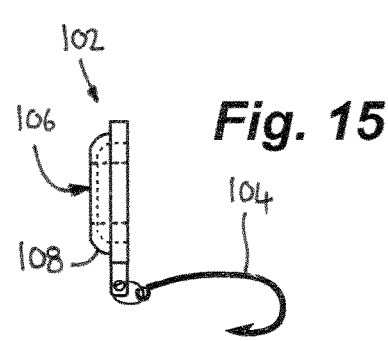

In FIG. 15 there is shown a hook clip 102 and hook 104 which may, for example, be used in conjunction with the head formation 14 and extension shaft 15 combinations of FIG. 8 to 10, 12 or 14. The hook clip 102 has a central passage 106 allowing the extension shaft 15 to pass through, and a forwardly extending projection 108 adapted to be received in the recess 24 of the relevant head formation.

For example, if a tube plug 80 as shown in FIG. 11 is to be attached to the relevant head formation 14 by screwing it on the extension shaft 15, the extension shaft can be passed through the central passage 106 of the hook clip 102 before the tube plug 80 is screwed onto the extension shaft so that the hook clip is held captive between the head formation and the tube plug.

In this case, as in the case of the popper head formation 14 of FIG. 14, an additional fish hook 76 may also be used, secured to the fishing line 70 passing through the passage 20 of the head formation and passage 82 of the tube plug 80.

Figure 16:
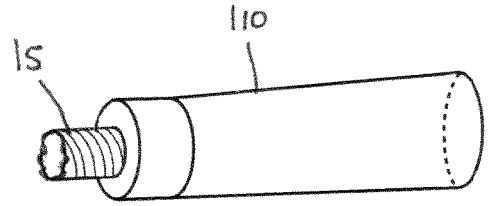

In FIG. 16 there is shown a camera 110 also known in the art as a bullet camera plug, and this is shown attached to an extension shaft 15, for example of a bullet head formation 14 as shown in FIG. 8. The bullet camera plug 110 is provided with a threaded passage (not shown) which is complementary to the extension shaft 15 for receiving and being attached to the extension shaft.

Generally, a bullet camera plug 110 will be used to film underwater activity, especially close-swimming fish, rather than for fishing. However, it may be used in conjunction with a hook clip 102 in the manner described above in order to catch fish as well as film underwater activity.

The device 10 can also be provided in kit form. According to a preferred embodiment, such a kit includes a lure connector 18, and plurality of skirt components 16 having different appearances to one another (e.g. differently coloured skirts 36, and a plurality of lure head components 13 having head formations 14 with different outer visual patterns and/or of different colours, and/or of different shapes to provide different movement characteristics in the water). The kit may also include the components of the types illustrated in FIGS. 8 to 16.

Thus, if a fisherman has been fishing with a fishing lure device 10 assembled with a particular combination of head formation 14 and skirt components 16, and if the fisherman wishes to change the component to use another head formation or skirt components, the existing head formation and/or skirt components can be detached from the lure connector, and replaced by another desirable head formation and/or other skirt components available in the kit, in the manner described above. The changing of the components in this manner is enabled by the fact that, once the extension shaft 15 and connector 18 are detached from each other, the head component 13 and each of the skirt components 16 are removable separately (independently) from one another.

Such a change may be desirable when a change in fishing tactics is required, such as when a decision is made to catch another type of fish to that sought previously, or to make allowance for changing weather or light conditions, and so on.

This can assist in avoiding the need to have a plurality of different pre-assembled or pre-configured fishing lures having such differing appearances or characteristics to one another.

Although the invention is described above in relation to preferred embodiments, it will be appreciated by those skilled in the art that it is not limited to those embodiments, but may be embodied in many other forms.

The invention claimed is:

1. A fishing lure device for use with an elongate fishing line having a fishing line thickness, the fishing line being provided with a blocking portion of broader lateral dimension than the fishing line thickness, the lure device including:
   a lure component adapted to be drawn by the fishing line through water in an operational direction of movement, the lure component having a first lure component end and a second lure component end and an inner lure component passage extending from the first lure component end to the second lure component end, the lure component including a lure head having an outer surface that constitutes an outer surface of part of the fishing lure device, wherein at least a portion of said outer surface of the lure head is adapted to be a leading portion of the lure head as the lure component is drawn through the water by the fishing line in said operational direction of movement, wherein the lure component passage has an inner diameter adapted to allow the blocking portion to pass therethrough, the lure component further having a first screw thread connector formation; and an elongate lure connector having a first connector end and a second connector end and a central connector passage extending from the first connector end to the second connector end, wherein the connector passage has an inner diameter adapted to obstruct the blocking portion to prevent the blocking portion from passing therethrough, the lure connector further having a second screw thread connector formation complementary to said first screw thread connector formation;

wherein the lure connector is adapted to be releasably connectable to the lure component by passing the lure component in a first direction relative to the lure connector over the second connector end such that the lure connector extends at least partly into the lure component passage via the first lure component end, and engaging the first screw thread connector formation and the second screw thread connector formation with each other by relative rotation between the lure connector and lure component such that the lure connector rotates in a tightening rotational direction relative to the lure component, and such that, when the fishing line is disposed so as to extend through the connector passage and lure component passage with the blocking portion being disposed on a part of the fishing line immediately adjacent to the second lure component end, the lure connector and lure component are detachable from each other by disengaging the first screw thread connector formation and the second screw thread connector formation from each other by relative rotation between the lure connector and lure component such that the lure connector rotates in a loosening rotational direction, opposite to the tightening rotational direction, relative to the lure component, and withdrawing the lure component in a second direction opposite to the first direction relative to the lure connector, and the lure component is removable from the line by moving the lure component and blocking portion relative to each other such that the blocking portion passes through the lure component passage in the first direction relative to the lure component.

2. A fishing lure device according to claim 1, adapted for the lure component passage and connector passage to be co-axial relative to each other when the lure connector is connected to the lure component.

3. A fishing lure device according to claim 1, wherein the connector passage has an inner diameter which is less than an inner diameter of the lure component passage.

4. A fishing lure device according to claim 1, wherein the lure connector is adapted, when connected to the lure component, to protrude from the first lure component end.

5. A fishing lure device according to claim 4 wherein the lure connector includes a stop formation for limiting the extent to which the lure connector can be received within the lure component passage.

6. A fishing lure device according to claim 1, wherein the lure component includes at least one skirt component which is releasably connectable in relation to the head.

7. A fishing lure device according to claim 6 wherein the lure component includes a skirt connector adapted for enabling said releasable connection of the at least one skirt component.

8. A fishing lure device according to claim 7 wherein the lure component includes an extension portion extending from the head, the extension portion including the skirt connector.

9. A fishing lure device according to claim 8 wherein the at least one skirt component is releasably connectable in relation to the head by way of the at least one skirt component being releasably connectable to the extension portion.

10. A fishing lure device according to claim 8, wherein the head is releasably connectable to the lure connector whereby the lure connector is releasably connectable relative to the at least one skirt component.

11. A fishing lure device according to claim 6, wherein the at least one skirt component includes skirt tassels.

12. A fishing lure assembly including:
a fishing lure device; and
an elongate fishing line having a fishing line thickness, the fishing line being provided with a blocking portion of broader lateral dimension than the fishing line thickness, wherein the lure device includes:
a lure component adapted to be drawn by the fishing line through water in an operational direction of movement, the lure component having a first lure component end and a second lure component end and an inner lure component passage extending from the first lure component end to the second lure component end, the lure component including a lure head having an outer surface that constitutes an outer surface of part of the fishing lure device, wherein at least a portion of said outer surface of the lure head is adapted to be a leading portion of the lure head as the lure component is drawn through the water by the fishing line in said operational direction of movement, wherein the lure component passage has an inner diameter adapted to allow the blocking portion to pass therethrough, the lure component further having a first screw thread connector formation; and an elongate lure connector having a first connector end and a second connector end and a central connector passage extending from the first connector end to the second connector end, wherein the connector passage has an inner diameter adapted to obstruct the blocking portion to prevent the blocking portion from passing therethrough, the lure connector further having a second screw thread connector formation complementary to said first screw thread connector formation, wherein the lure connector is adapted to be releasably connectable to the lure component by passing the lure component in a first direction relative to the lure connector over the second connector end such that the lure connector extends at least partly into the lure component passage via the first lure component end, and engaging the first screw thread connector formation and the second screw thread connector formation with each other by relative rotation between the lure connector and lure component such that the lure connector rotates in a tightening rotational direction relative to the lure component, wherein, when the fishing line is disposed so as to extend through the connector passage and lure component passage with the blocking portion being disposed on a part of the fishing line immediately adjacent to the second lure component end, the lure connector and lure component being detachable from each other by disengaging the first screw thread connector formation and the second screw thread connector formation from each other by relative rotation between the lure connector and lure component such that the lure connector rotates in a loosening rotational direction, opposite to the tightening rotational direction, relative to the lure component, and withdrawing the lure component in a second direction opposite to the first direction relative to the lure connector, and the lure component is removable from the line by moving the lure component and blocking portion relative to each other such that the blocking portion passes through the lure component passage in the first direction relative to the lure component.

13. A fishing lure device kit adapted for assembling a fishing lure device for use with a fishing line having a fishing line thickness, the fishing line being provided with a blocking portion of broader lateral dimension than the fishing line thickness, the kit including:
 a plurality of selectable lure components, each lure component being adapted to be drawn by the fishing line through water in an operational direction of movement, each lure component having a first lure component end and a second lure component end and an inner lure component passage extending from the first lure component end to the second lure component end, each lure component including a lure head having an outer surface that constitutes an outer surface of part of the fishing lure device, wherein at least a portion of said outer surface of the lure head is adapted to be a leading portion of the lure head as the respective lure component is drawn through the water by the fishing line in said operational direction of movement, wherein the lure component passage of each of the lure components has an inner diameter adapted to allow the blocking portion to pass therethrough, each lure component further having a first screw thread connector formation; and
 an elongate lure connector having a first connector end and a second connector end and a central connector passage extending from the first connector end to the second connector end, wherein the connector passage has an inner diameter adapted to obstruct the blocking portion to prevent the blocking portion from passing therethrough, the lure connector further having a second screw thread connector formation complementary to said first screw thread connector formation,
 wherein the lure connector is adapted for releasable connection to each of said lure components, one lure component of the plurality of selectable lure components at a time, by passing the respective lure component in a first direction relative to the lure connector over the second connector end such that the lure connector extends at least partly into the lure component passage via the first lure component end, and engaging the first screw thread connector formation and the second screw thread connector formation with each other by relative rotation between the lure connector and respective lure component such that the lure connector rotates in a tightening rotational direction relative to the lure component, and such that, when the fishing line is disposed so as to extend through the lure component passage of the respective lure component and the connector passage, with the blocking portion being disposed on a part of the fishing line immediately adjacent to the second lure component end, the lure connector and lure component are detachable from each other by disengaging the first screw thread connector formation and the second screw thread connector formation from each other by relative rotation between the lure connector and respective lure component such that the lure connector rotates in a loosening rotational direction, opposite to the tightening rotational direction, relative to the respective lure component, and withdrawing the respective lure component in a second direction opposite to the first direction relative to the lure connector, and the respective lure component is removable from the line by moving the lure component and blocking portion relative to each other such that the blocking portion passes through the lure component passage in the first direction relative to the lure component.

14. A fishing lure device kit according to claim 13, including a plurality of selectable skirt components which are respectively releasably connectable in relation to each respective selected head when the respective head is in use to form the part of the lure component.

15. A fishing lure device kit according to claim 14, wherein each skirt component includes skirt tassels.

* * * * *